(12) United States Patent
Jung et al.

(10) Patent No.: US 12,141,398 B2
(45) Date of Patent: Nov. 12, 2024

(54) GATE DRIVER HAVING A PLURALITY OF START CIRCUITS AND DISPLAY DEVICE INCLUDING THE SAME

(71) Applicant: LG Display Co., Ltd., Seoul (KR)

(72) Inventors: Hojin Jung, Daejeon (KR); ChungSik Kong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/559,778

(22) Filed: Dec. 22, 2021

(65) Prior Publication Data

US 2022/0206664 A1   Jun. 30, 2022

(30) Foreign Application Priority Data

Dec. 24, 2020   (KR) .................. 10-2020-0183884

(51) Int. Cl.
*G06F 3/041*       (2006.01)
*G09G 3/20*        (2006.01)

(52) U.S. Cl.
CPC .......... *G06F 3/04184* (2019.05); *G09G 3/20* (2013.01); *G09G 2310/0267* (2013.01); *G09G 2310/08* (2013.01)

(58) Field of Classification Search
None
See application file for complete search history.

(56) References Cited

U.S. PATENT DOCUMENTS

| 7,969,402 B2 | 6/2011 | Lee |
| 9,557,840 B2 | 1/2017 | Lin et al. |
| 10,629,146 B2 | 4/2020 | Song et al. |
| 10,656,743 B2 | 5/2020 | Park et al. |
| 11,069,274 B2 * | 7/2021 | Wang ............... G11C 19/28 |
| 2002/0190943 A1 | 12/2002 | Kayada et al. |
| 2007/0085811 A1 | 4/2007 | Lee |
| 2008/0297457 A1 | 12/2008 | Song et al. |
| 2012/0212517 A1 * | 8/2012 | Ahn ................ G11C 19/28 |
| | | 345/77 |
| 2015/0220194 A1 | 8/2015 | Lin et al. |
| 2016/0293081 A1 * | 10/2016 | Kitsomboonloha .. G06F 3/0416 |
| 2017/0004796 A1 * | 1/2017 | Zhao ............... G11C 19/287 |

(Continued)

FOREIGN PATENT DOCUMENTS

| CN | 1953035 A | 4/2007 |
| CN | 101315755 A | 12/2008 |

(Continued)

OTHER PUBLICATIONS

China National Intellectual Property Administration, Office Action, Chinese Patent Application No. 202111588432.5, Dec. 22, 2023, 16 pages.

(Continued)

*Primary Examiner* — Roberto W Flores

(74) *Attorney, Agent, or Firm* — Fenwick & West LLP

(57) ABSTRACT

A gate driver includes a plurality of stage groups each including a plurality of stages; and a plurality of start circuits each configured to output a start signal to each of the plurality of stage groups, wherein each of the plurality of start circuits outputs the start signal to an uppermost stage among the plurality of stages of each of the plurality of stage groups, so that an area of the gate driver can be reduced.

20 Claims, 10 Drawing Sheets

(56) References Cited

U.S. PATENT DOCUMENTS

| | | | | |
|---|---|---|---|---|
| 2017/0115808 A1* | 4/2017 | Cho | .................... | G06F 3/04184 |
| 2017/0285375 A1* | 10/2017 | Iwase | ..................... | G11C 19/28 |
| 2018/0121023 A1* | 5/2018 | Kim | ..................... | G09G 3/3677 |
| 2019/0122631 A1* | 4/2019 | Koide | ................... | G09G 3/3648 |
| 2019/0129560 A1* | 5/2019 | Li | ........................ | G09G 3/3266 |
| 2019/0155433 A1 | 5/2019 | Park et al. | | |
| 2021/0312868 A1* | 10/2021 | Kim | ..................... | G09G 3/3266 |

FOREIGN PATENT DOCUMENTS

| | | |
|---|---|---|
| CN | 110007792 A | 7/2019 |
| KR | 10-2016-0105466 A | 9/2016 |

OTHER PUBLICATIONS

China National Intellectual Property Administration, Notice of Allowance, Chinese Patent Application No. 202111588432.5, Jul. 18, 2024, seven pages.

\* cited by examiner

GATE DRIVER HAVING A PLURALITY OF START CIRCUITS AND DISPLAY DEVICE INCLUDING THE SAME

CROSS-REFERENCE TO RELATED APPLICATIONS

This application claims the benefit of and priority to Korean Patent Application No. 10-2020-0183884 filed on Dec. 24, 2020 in the Republic of Korea, the entire contents of which are hereby expressly incorporated by reference into the present application.

BACKGROUND

Technical Field

The present disclosure relates to a gate driver and a display device including the same, and more particularly, to a display device in which an area of the gate driver is minimized.

Discussion of the Related Art

Display devices used in computer monitors, TVs, and mobile phones include organic light emitting displays (OLEDs) that emit light by themselves, and liquid crystal displays (LCDs) that require a separate light source.

Such display devices are being applied to more and more various fields including not only a computer monitor and a TV, but personal mobile devices, and thus, display devices having a reduced volume and weight while having a wide display area are being studied.

Meanwhile, among display devices, there is a touch screen-integrated display device including a touch unit capable of recognizing a user's touch. The touch screen-integrated display device can directly input information using a user's finger or a pen, and accordingly, is widely applied to portable terminals, navigation devices, and home appliances.

SUMMARY

An aspect of the present disclosure is to provide a gate driver in which a display period and a touch sensing period are performed together in one frame in order to improve touch sensitivity, and a display device including the same.

Another aspect of the present disclosure is to provide a gate driver capable of easily operating a gate driving circuit that is temporarily stopped during a touch sensing period when a display period starts, and a display device including the same.

Still another aspect of the present disclosure is to provide a gate driver allowing for simplification of lines to which start signals for operating the gate driver are applied, and a display device including the same.

Objects of the present disclosure are not limited to the above-mentioned objects, and other objects, which are not mentioned above, can be clearly understood by those skilled in the art from the following descriptions.

A gate driver according to an exemplary embodiment of the present disclosure includes a plurality of stage groups each including a plurality of stages; and a plurality of start circuits each configured to output a start signal to each of the plurality of stage groups, wherein each of the plurality of start circuits outputs the start signal to an uppermost stage among the plurality of stages of each of the plurality of stage groups, so that an area of the gate driver can be reduced.

A display device according to another exemplary embodiment of the present disclosure includes a display panel including a display area in which a plurality of sub-pixels are disposed and a non-display area outside the display area; a gate driver disposed in the non-display area; and a touch driver configured to detect a touch input on the display panel, wherein the gate driver includes a plurality of stage groups each including a plurality of stages and a plurality of start circuits each configured to output a start signal to each of the plurality of stage groups, wherein each of the plurality of start circuits outputs the start signal to an uppermost stage among the plurality of stages of each of the plurality of stage groups, so that a size of a bezel area of the display panel can be minimized.

Other detailed matters of the exemplary embodiments are included in the detailed description and the drawings.

According to the present disclosure, start lines to which start signals for driving a gate driver in a display period are applied, can be simplified.

According to the present disclosure, a size of a bezel can be reduced by reducing an area of the gate driver.

According to the present disclosure, output characteristics of a plurality of start signals can be improved by bootstrapping gate nodes of a plurality of pull-up transistors.

The effects according to the present disclosure are not limited to the contents exemplified above, and more various effects are included in the present specification.

DETAILED DESCRIPTION OF THE EMBODIMENTS

Figure 1:
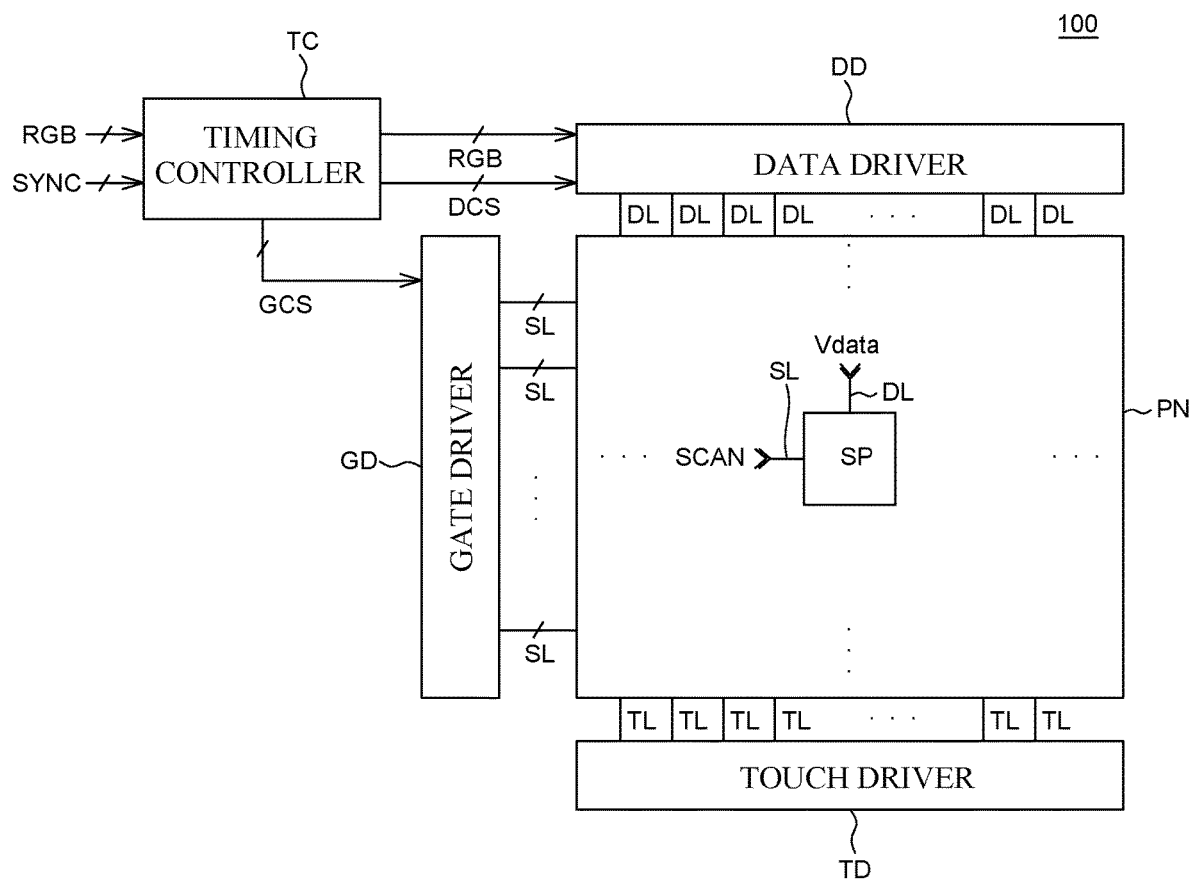
FIG. 1 is a schematic configuration diagram of a display device according to an exemplary embodiment of the present disclosure.

The advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person with ordinary skill in the art to which the present disclosure pertains with the category of the present disclosure, and the present disclosure will be defined by the appended claims.

The shapes, dimensions, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Throughout the whole specification, the same reference numerals denote the same elements.

Since the dimensions and thickness of each component illustrated in the drawings are represented for convenience in explanation, the present disclosure is not necessarily limited to the illustrated dimensions and thickness of each component.

The features of various embodiments of the present disclosure can be partially or entirely coupled to or combined with each other and can be interlocked and operated in technically various ways, and the embodiments can be carried out independently of or in association with each other.

Hereinafter, various exemplary embodiments of the present disclosure will be described in detail with reference to the accompanying drawings.

FIG. 1 is a schematic configuration diagram of a display device according to an exemplary embodiment of the present disclosure. In FIG. 1, only a display panel PN, a gate driver GD, a data driver DD, and a timing controller TC among various components of a display device 100 are illustrated for convenience of explanation.

Referring to FIG. 1, the display device 100 includes the display panel PN including a plurality of sub-pixels, and the gate driver GD and the data driver DD for supplying various signals to the display panel PN, the timing controller TC for controlling the gate driver GD and the data driver DD, and a touch driver TD for sensing a touch input.

The gate driver GD supplies a plurality of scan signals SCAN to a plurality of scan lines SL according to a plurality of gate control signals GCS provided from the timing controller TC. Although it is illustrated in FIG. 1 that the gate driver GD is disposed to be spaced apart from one side of the display panel PN, the number and arrangement of gate drivers GD are not limited thereto.

The data driver DD converts image data RGB input from the timing controller TC into a data signal Vdata using a reference gamma voltage according to a plurality of data control signals DCS provided from the timing controller TC. In addition, the data driver DD may supply the converted data signal Vdata to a plurality of data lines DL.

The timing controller TC aligns the image data RGB input from the outside and supplies it to the data driver DD. The timing controller TC may generate gate control signals GCS and data control signals DCS using synchronization signals SYNC input from the outside, for example, a dot clock signal, a data enable signal, and a horizontal/vertical synchronization signal. In addition, the timing controller TC may supply the generated gate control signal GCS and data control signal DCS to the gate driver GD and the data driver DD, respectively, to thereby control the gate driver GD and the data driver DD.

The touch driver TD drives a touch unit during a touch sensing period based on a touch enable signal ES input from the timing controller or an external component. The touch driver TD may sense a touch input by supplying a touch driving signal to a plurality of touch electrodes of the touch unit through a touch sensing line TL during the touch sensing period.

Although not shown in the drawings, the touch unit is configured to include a plurality of touch electrodes configured to detect a touch input. The touch unit may be disposed to overlap the display panel PN, and may detect a touch input that is input to the display panel PN. The plurality of touch electrodes may be connected to the touch sensing line TL and the touch driver TD and sense a touch input. In this case, depending on an arrangement method of the touch electrodes, it may include an add-on type in which a separate touch unit is manufactured and attached to the display panel PN, and an on-cell type in which the touch unit is directly formed on the display panel PN, and an in-cell type in which the touch unit is built into the display panel PN.

The display panel PN, a component for displaying an image to a user, includes the plurality of sub-pixels. In the display panel PN, the plurality of scan lines SL and the plurality of data lines DL cross each other, and each of the plurality of sub-pixels is connected to the scan line SL and the data line DL. In addition, although not illustrated in the drawings, each of the plurality of sub-pixels may be connected to a high potential power line, a low potential power line, an initialization signal line, an emission control signal line, and the like.

The plurality of sub-pixels are minimum units constituting a screen, and each of the plurality of sub-pixels includes a light emitting element and a pixel circuit for driving the light emitting element. A plurality of light emitting elements may be differently defined according to a type of the display panel PN. For example, when the display panel PN is an organic light emitting display panel, the light emitting element is an organic light emitting element including an anode, an organic layer, and a cathode. In addition, a quantum dot light emitting diode (QLED) including a quantum dot (QD), or the like may be used as the light emitting element. Hereinafter, a description will be made on the assumption that the light emitting element is an organic light emitting element, but a type of the light emitting element is not limited thereto.

Hereinafter, a method of driving a display device according to an exemplary embodiment of the present disclosure will be described with reference to FIG. 2.

Figure 2:
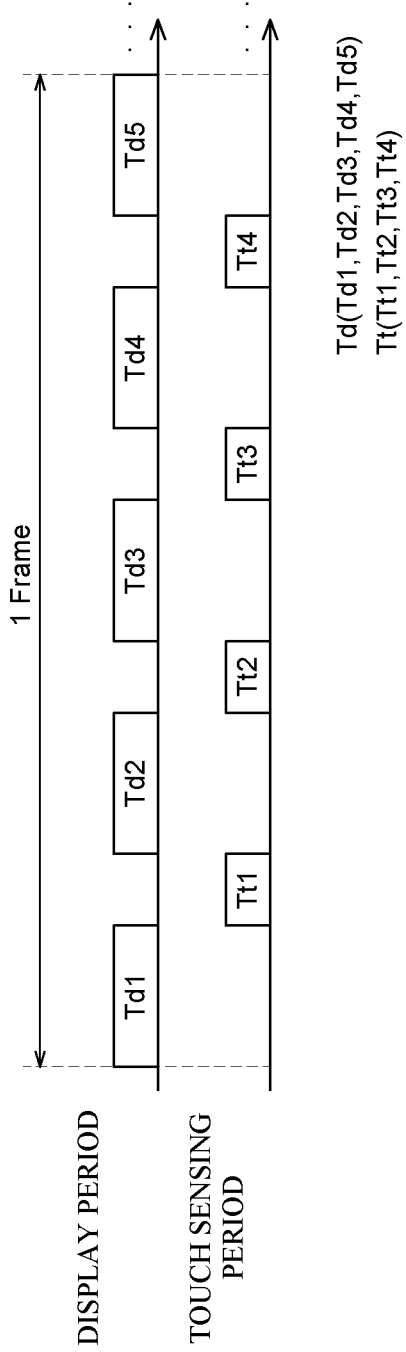
FIG. 2 is a diagram for explaining a method of driving a display device according to an exemplary embodiment of the present disclosure.

FIG. 2 is a diagram for explaining a method of driving a display device according to an exemplary embodiment of the present disclosure.

First, referring to FIG. 2, the display device 100 according to an exemplary embodiment of the present disclosure may time-divide one frame period into a plurality of display periods Td and a plurality of touch sensing periods Tt and input the image data RGB to the display panel PN only during the display period Td.

For example, one frame period may include a plurality of display periods Td for inputting data to the plurality of sub-pixels and a plurality of touch sensing periods Tt for driving the touch unit. In addition, the plurality of display periods Td and the plurality of touch sensing periods Tt may be alternately repeated within one frame period. A driving method in which the display periods Td and the touch sensing periods Tt are alternately repeated during one frame period is called an Intra-Frame Pause (IFP) method. In the IFP method, by disposing the touch sensing period Tt in one frame period, a touch sensing time may be secured and touch sensitivity may be improved. That is, touch performance of the display device may be improved through the IFP method.

The plurality of display periods Td is a period in which image data RGB is input to the plurality of sub-pixels, and in the plurality of display periods Td, the gate driver GD may sequentially output the scan signals SCAN to the display panel PN, and the data driver DD may be synchronized with the scan signal SCAN and supply the data signal Vdata to the display panel PN.

The plurality of touch sensing periods Tt is a period in which the touch unit including the plurality of touch electrodes is driven. The gate driver GD stops output of the scan signal SCAN, and the touch driver TD may supply the touch driving signal to the touch unit.

Hereinafter, the gate driver of the display device according to an exemplary embodiment of the present disclosure will be described in more detail.

Figure 3:
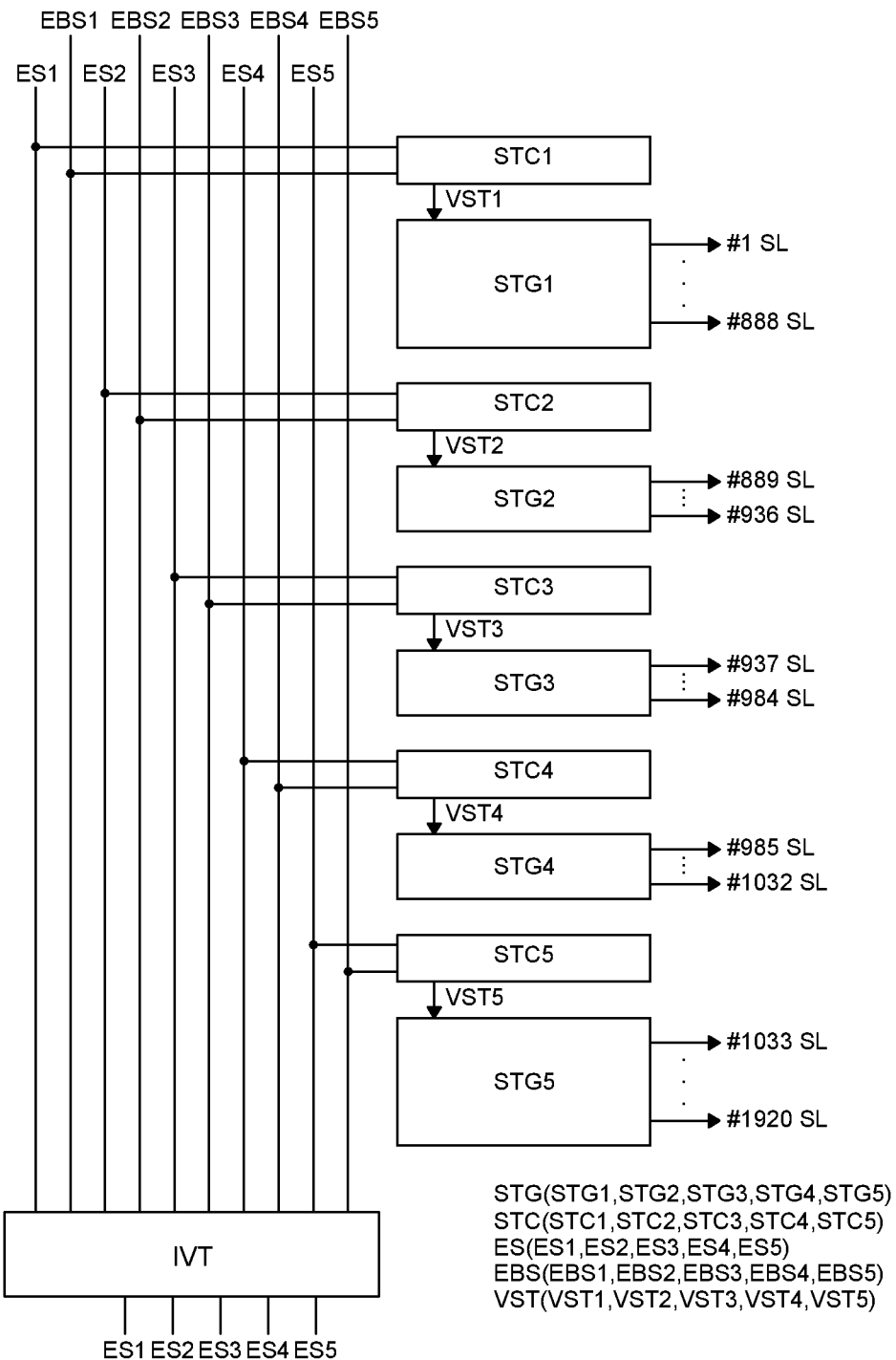
FIG. 3 is a schematic block diagram of a gate driver of the display device according to an exemplary embodiment of the present disclosure.

FIG. 3 is a schematic block diagram of the gate driver of the display device according to an exemplary embodiment of the present disclosure.

Referring to FIG. 3, the gate driver GD of the display device according to an exemplary embodiment of the present disclosure may include a plurality of stage groups STG, a plurality of start circuits STC, and an inverter IVT.

Each of the plurality of stage groups STG may output a scan signal corresponding to each of the plurality of display periods Td. For example, the gate driver GD may include the first stage group STG1, the second stage group STG2, the third stage group STG3, the fourth stage group STG4, and the fifth stage group STG5.

And, referring to FIGS. 2 and 3, the first stage group STG1 may be driven during a first display period Td1 among the plurality of display periods Td, the second stage group STG2 may be driven during a second display period Td2 among the plurality of display periods Td, the third stage group STG3 may be driven during a third display period Td3 among the plurality of display periods Td, the fourth stage group STG4 may be driven during a fourth display period Td4 among the plurality of display periods Td, and the fifth stage group STG5 may be driven during a fifth display period Td5 among the plurality of display periods Td. The number of the plurality of stage groups STG may correspond to the number of the plurality of display periods Td during one frame time.

More specifically, when the display panel includes 1920 scan lines, respective stages of the first stage group STG1 sequentially output scan signals to a first scan line #1 SL to an 888th scan line #888 SL during the first display period Td1. In addition, during the second display period Td2, respective stages of the second stage group STG2 sequentially output scan signals to an 889th scan line #889 SL to a 936th scan line #936 SL. In addition, during the third display period Td3, respective stages of the third stage group STG3 sequentially output scan signals to a 937th scan line #937 SL to a 984th scan line #984 SL. In addition, during the fourth display period Td4, respective stages of the fourth stage group STG4 sequentially output scan signals to a 985th scan line #985 SL to a 1032nd scan line #1032 SL. In addition, during the fifth display period Td5, respective stages of the fifth stage group STG5 sequentially output scan signals to a 1033th scan line #1033 SL to a 1920th scan line #1920 SL.

Referring to FIG. 2, the plurality of touch sensing periods Tt in which the touch driver TD is driven are disposed between the plurality of respective display periods Td. For example, the plurality of touch sensing periods Tt may include a first touch sensing period Tt1, a second touch sensing period Tt2, a third touch sensing period Tt3, and a fourth touch sensing period Tt4. The first touch sensing period Tt1 may be a period in which the touch driver TD operates after driving of the first stage group STG1 is completed, the second touch sensing period Tt2 may be a period in which the touch driver TD operates after driving of the second stage group STG2 is completed, the third touch sensing period Tt3 may be a period in which the touch driver TD operates after driving of the third stage group STG3 is completed, the fourth touch sensing period Tt4 may be a period in which the touch driver TD operates after driving of the fourth stage group STG4 is completed, and the fifth touch sensing period Tt5 may be a period in which the touch driver TD operates after driving of the fifth stage group STG5 is completed.

However, the numbers of the plurality of display periods Td and the plurality of touch sensing periods Tt that are illustrated in FIG. 2 is exemplary and is not limited thereto.

In addition, the plurality of start circuits STC may output start signals VST to the plurality of stage groups STG. Specifically, each of the plurality of start circuits STC may be disposed in front of each of the plurality of stage groups STG and output the start signal VST to each of the plurality of stage groups STG according to an enable signal ES and an enable bar signal EBS.

For example, a first start circuit STC1 may be disposed in front of the first stage group STG1, receive a first enable signal ES1 and a first enable bar signal EBS1, and output a first start signal VST1 to the first stage group STG1.

In addition, a second start circuit STC2 may be disposed in front of the second stage group STG2, receive a second enable signal ES2 and a second enable bar signal EBS2, and output a second start signal VST2 to the second stage group STG2.

In addition, a third start circuit STC3 may be disposed in front of the third stage group STG3, receive a third enable signal ES3 and a third enable bar signal EBS3, and output a third start signal VST3 to the third stage group STG3.

In addition, a fourth start circuit STG4 may be disposed in front of the fourth stage group STG4, receive a fourth enable signal ES4 and a fourth enable bar signal EBS4, and output a fourth start signal VST4 to the fourth stage group STG4.

In addition, a fifth start circuit STC5 may be disposed in front of the fifth stage group STG5, receive a fifth enable signal ES5 and a fifth enable bar signal EBS5, and output a fifth start signal VST5 to the fifth stage group STG5.

In addition, the inverter IVT may receive a plurality of the enable signals ES and output the enable signals ES and the enable bar signals EBS to the plurality of respective start circuits STC.

For example, the inverter IVT receives the first enable signal ES1 to the fifth enable signal ES5, and may output the first enable signal ES1 and the enable bar signal EBS1 to the first start circuit STC1, output the second enable signal ES2 and the second enable bar signal EBS2 to the second start circuit STC2, output the third enable signal ES3 and the third enable bar signal EBS3 to the third start circuit STC3, output the fourth enable signal ES4 and the fourth enable bar signal EBS4 to the fourth start circuit STC, and output the fifth enable signal ES5 and the fifth enable bar signal EBS5 to the fifth start circuit STC5.

Figure 4:
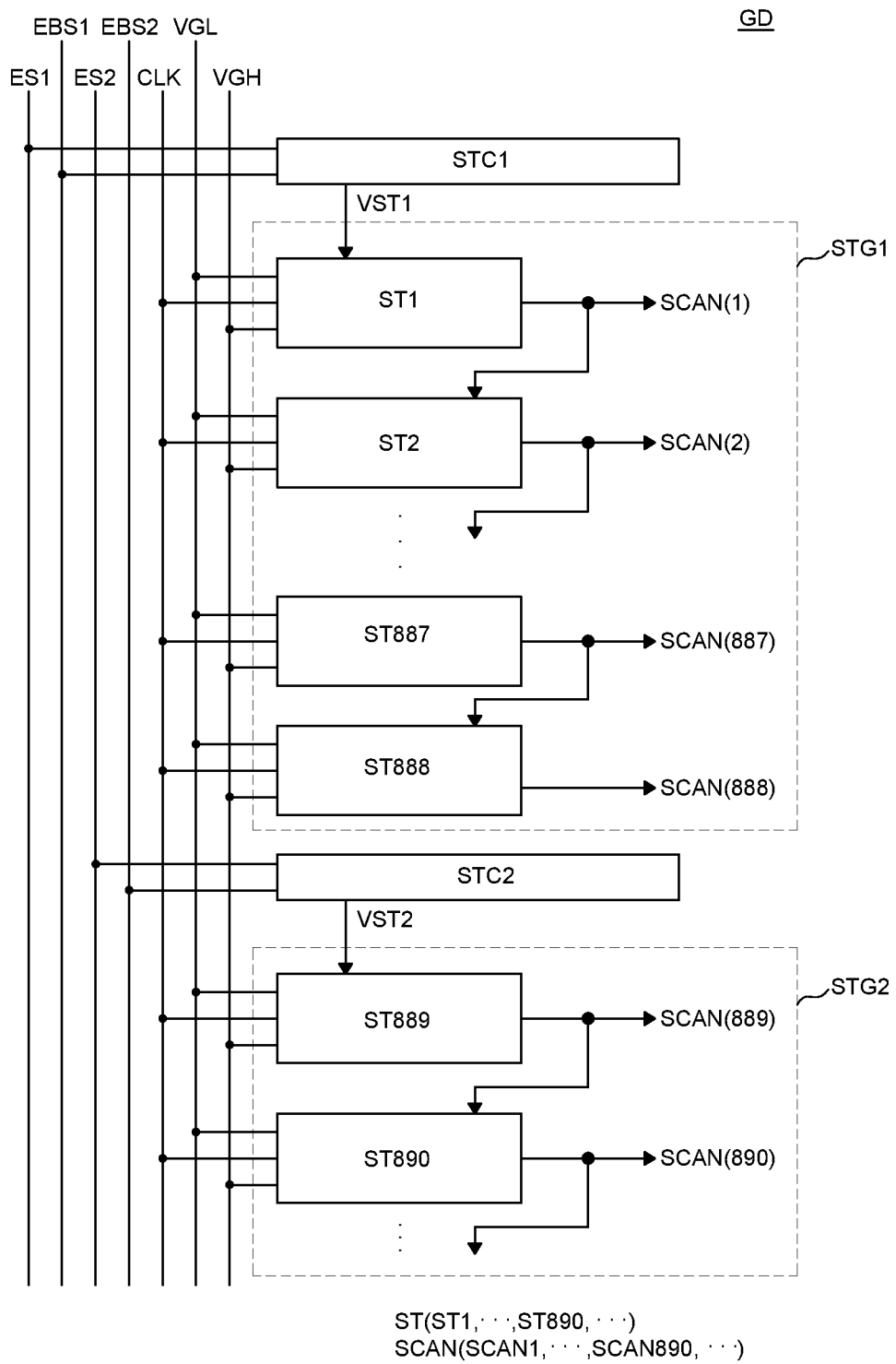
FIG. 4 is a block diagram of stage groups of the gate driver of the display device according to an exemplary embodiment of the present disclosure.

FIG. 4 is a block diagram of stage groups of the gate driver of the display device according to an exemplary embodiment of the present disclosure.

In FIG. 4, an entirety of the first stage group STG1 and only a part of the second stage group STG2 are illustrated for convenience of description.

Referring to FIG. 4, each of the plurality of stage groups STG includes a plurality of stages ST. The plurality of stages ST may be dependently connected to each other and sequentially output the scan signals SCAN.

Each of the plurality of start circuits STC outputs the start signal to an uppermost stage ST1 or ST889 among the plurality of stages ST of each of the plurality of stage groups STG.

Specifically, the plurality of stages ST may receive the start signals VST output from the start circuits STC or outputs of the previous stages ST1, ST2, ST878, ST889, charge Q nodes, and output the scan signals SCAN to the scan lines SL corresponding to the plurality of respective stages ST.

For example, the first stage ST1, which is the uppermost stage of the first stage group STG1, may generate a scan signal SCAN(1) using the first start signal VST1 output from the first start circuit STC1. In addition, respective remaining stages ST2, . . . , and ST888 after the first stage ST1 of the first stage group STG1 may sequentially output the scan signals SCAN using scan signals SCAN(1), . . . , and SCAN(887) that are output from the previous stages ST1, . . . , and ST887.

Meanwhile, since the plurality of respective stage groups STG are independently driven to correspond to the plurality of display periods Td, the lowest stage ST888 of each of the plurality of stage groups STG may be separated from the uppermost stage ST889 of the next stage group STG2.

For example, in order to individually drive the first stage group STG1 and the second stage group STG2, the 889th stage ST889, which is the uppermost stage of the second stage group STG2, may not be connected to the 888th stage ST888, which is the lowest stage of the first stage group STG1.

And, the 889th stage ST889, which is the uppermost stage of the second stage group STG2, may output a scan signal SCAN(889) using the second start signal VST2 that is output from the second start circuit STC2.

Figure 5:
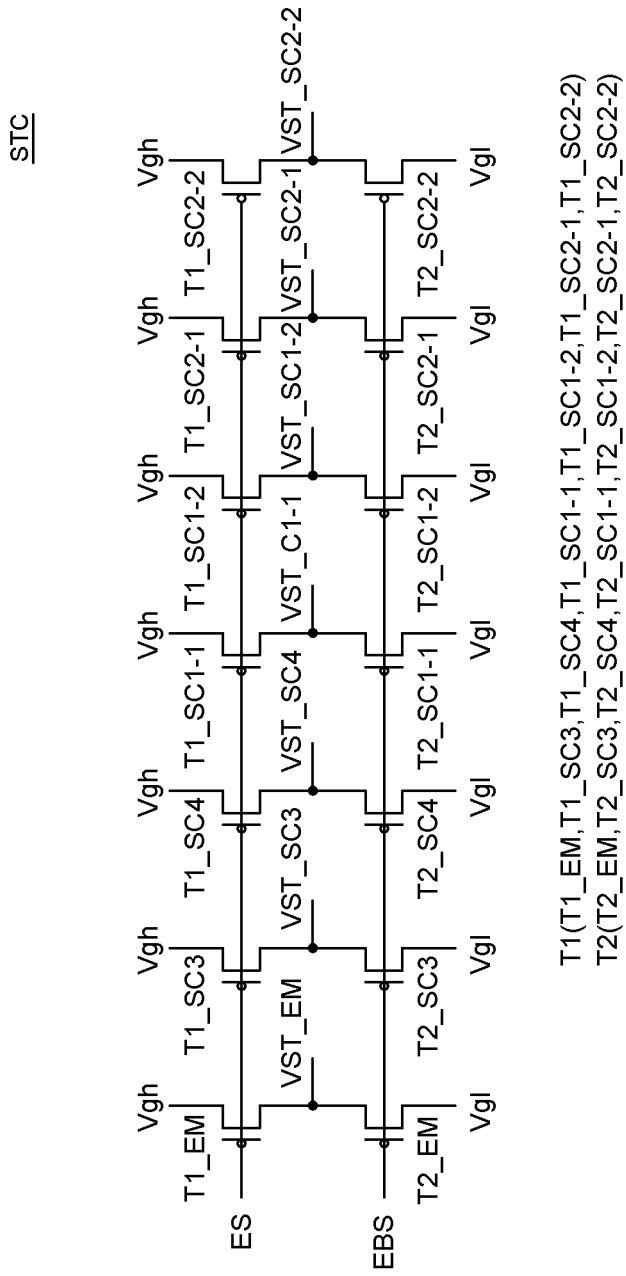
FIG. 5 is a circuit diagram illustrating a start circuit of the gate driver of a display device according to an exemplary embodiment of the present disclosure.

FIG. 5 is a circuit diagram illustrating a start circuit of the gate driver of a display device according to an exemplary embodiment of the present disclosure.

For reference, each of the plurality of stages includes an emission stage configured to output an emission signal, a first scan stage configured to output a first scan signal, a second scan stage configured to output a second scan signal, a third scan stage configured to output a third scan signal, and a fourth scan stage configured to output a fourth scan signal. The first scan stage includes an even-numbered first scan stage configured to output an even-numbered first scan signal and an odd-numbered first scan stage configured to output an odd-numbered first scan signal. The second scan stage includes an even-numbered second scan stage configured to output an even-numbered second scan signal and an odd-numbered second scan stage configured to output an odd-numbered second scan signal.

Accordingly, the above-described scan signals include the emission signals, the first scan signals, the second scan signals, the third scan signals, and the fourth scan signals. The first scan signals include the even-numbered first scan signal applied to an even-numbered scan line and the odd-numbered first scan signal applied to an odd-numbered scan line. The second scan signals include the even-numbered second scan signal applied to an even-numbered scan line and the odd-numbered second scan signal applied to an odd-numbered scan line.

As illustrated in FIG. 5, each of the plurality of start circuits STC includes a plurality of pull-up transistors T1 to which the enable signal ES is applied and a plurality of pull-down transistors T2 to which the enable bar signal EBS is applied. Each of the pull-up transistor T1 and the pull-down transistor T2 described above may be a low-temperature polycrystalline silicon (LTPS) thin film transistor that is a p-type MOSFET (PMOS).

The plurality of pull-up transistors T1 output gate high voltages Vgh as the plurality of start signals VST according to the enable signal ES.

Specifically, each of the plurality of pull-up transistors T1 includes a gate electrode to which the enable signal ES is applied, a source electrode to which the gate high voltage Vgh is applied, and a drain electrode configured to output the start signal VST to each stage. Accordingly, each of the plurality of pull-up transistors T1 outputs the gate high voltage Vgh as the start signal VST to each stage ST when the enable signal ES of a low level, which is a turn-on level, is applied.

For example, the plurality of pull-up transistors T1 may include an emission pull-up transistor T1_EM, an odd-numbered first scan pull-up transistor T1_SC1-1, an even-numbered first scan pull-up transistor T1_SC1-2, an odd-numbered second scan pull-up transistor T1_SC2-1, an even-numbered second scan pull-up transistor T1_SC2-2, a third scan pull-up transistor T1_SC3, and a fourth scan pull-up transistor T1_SC4.

In addition, the emission pull-up transistor T1_EM outputs the gate high voltage Vgh as an emission start signal VST_EM while the enable signal ES is at a low level. In addition, the odd-numbered first scan pull-up transistor T1_SC1-1 outputs the gate-high voltage Vgh as an odd-numbered first scan start signal VST_SC1-1 while the enable signal ES is at a low level. In addition, the even-numbered first scan pull-up transistor T1_SC1-2 outputs the gate high voltage Vgh as an odd-numbered first scan start signal VST_SC1-2 while the enable signal ES is at a low level. Also, the odd-numbered second scan pull-up transistor T1_SC2-1 outputs the gate high voltage Vgh as an odd-numbered second scan start signal VST_SC2-1 while the enable signal ES is at a low level. Also, the even-numbered second scan pull-up transistor T1_SC2-2 outputs the gate high voltage Vgh as an odd-numbered second scan start signal VST_SC2-2 while the enable signal ES is at a low level. Also, the third scan pull-up transistor T1_SC3 outputs the gate high voltage Vgh as a third scan start signal VST_SC3 while the enable signal ES is at a low level, and the fourth scan pull-up transistor T1_SC4 outputs the gate high voltage Vgh as a fourth scan start signal VST_SC4 while the enable signal ES is at a low level.

The plurality of pull-down transistors T2 output gate low voltages Vg1 as the plurality of start signals VST according to the enable bar signal EBS.

Specifically, each of the plurality of pull-down transistors T2 includes a gate electrode to which the enable bar signal EBS is applied, a source electrode to which the gate low voltage Vg1 is applied, and a drain electrode configured to output the start signal VST to each stage. Accordingly, each of the plurality of pull-down transistors T2 outputs the gate low voltage Vg1 as the start signal VST to each stage ST when the enable bar signal EBS of a low level, which is a turn-on level, is applied.

For example, the plurality of pull-down transistors T2 may include an emission pull-down transistor T2_EM, an odd-numbered first scan pull-down transistor T2_SC1-1, an even-numbered first scan pull-down transistor T2_SC1-2, an odd-numbered second scan pull-down transistor T2_SC2-1, an even-numbered second scan pull-down transistor T2_SC2-2, a third scan pull-down transistor T2_SC3, and a fourth scan pull-down transistor T2_SC4.

In addition, the emission pull-down transistor T2_EM outputs the gate low voltage Vg1 as the emission start signal VST_EM while the enable bar signal EBS is at a low level. In addition, the odd-numbered first scan pull-down transistor T2_SC1-1 outputs the gate low voltage Vg1 as the odd-numbered first scan start signal VST_SC1-1 while the enable bar signal EBS is at a low level. In addition, the even-numbered first scan pull-down transistor T2_SC1-2 outputs the gate low voltage Vg1 as the even-numbered first scan start signal VST_SC1-2 while the enable bar signal EBS is at a low level. In addition, the odd-numbered second scan pull-down transistor T2_SC2-1 outputs the gate low voltage Vg1 as the odd-numbered second scan start signal VST_SC2-1 while the enable bar signal EBS is at a low level. In addition, the even-numbered second scan pull-down transistor T2_SC2-2 outputs the gate low voltage Vg1 as the even-numbered second scan start signal VST_SC2-2 while the enable bar signal EBS is at a low level. In addition, the third scan pull-down transistor T2_SC3 outputs the gate low voltage Vg1 as the third scan start signal VST_SC3 while the enable bar signal EBS is at a low level. In addition, the fourth scan pull-down transistor T2_SC4 outputs the gate low voltage Vg1 as the fourth scan start signal VST_SC4 while the enable bar signal EBS is at a low level.

Figure 6:
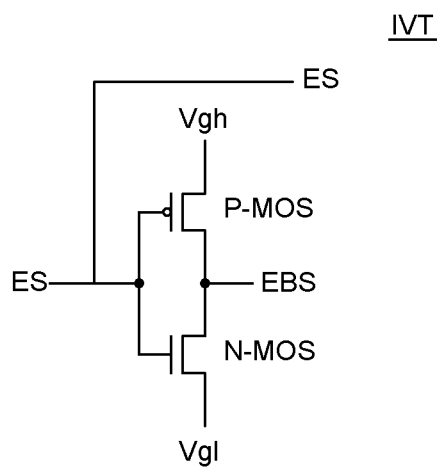
FIG. 6 is a circuit diagram illustrating an inverter of the gate driver of the display device according to an exemplary embodiment of the present disclosure.

FIG. 6 is a circuit diagram illustrating an inverter of the gate driver of the display device according to an exemplary embodiment of the present disclosure.

As shown in FIG. 6, the inverter IVT may be a complementary-MOS (CMOS) circuit. That is, the inverter IVT may be a complementary-MOS (CMOS) circuit in which a p-type MOSFET (P-MOS) and an n-type MOSFET (N-MOS) are connected in parallel.

Also, the gate high voltage Vgh is applied to a source electrode of the p-type MOSFET (P-MOS), and the gate low voltage Vg1 is applied to a source electrode of the n-type MOSFET (N-MOS).

Accordingly, when the enable signal ES of a low level is applied, the p-type MOSFET (P-MOS) is turned on and outputs the gate high voltage Vgh which is at a high level, as the enable bar signal EBS.

Conversely, when the enable signal ES of a high level is applied, the n-type MOSFET (N-MOS) is turned on and outputs the gate low voltage Vg1 which is at low level, as the enable bar signal EBS.

That is, the inverter IVT may output the enable signals ES and the enable bar signals EBS.

Figure 7:
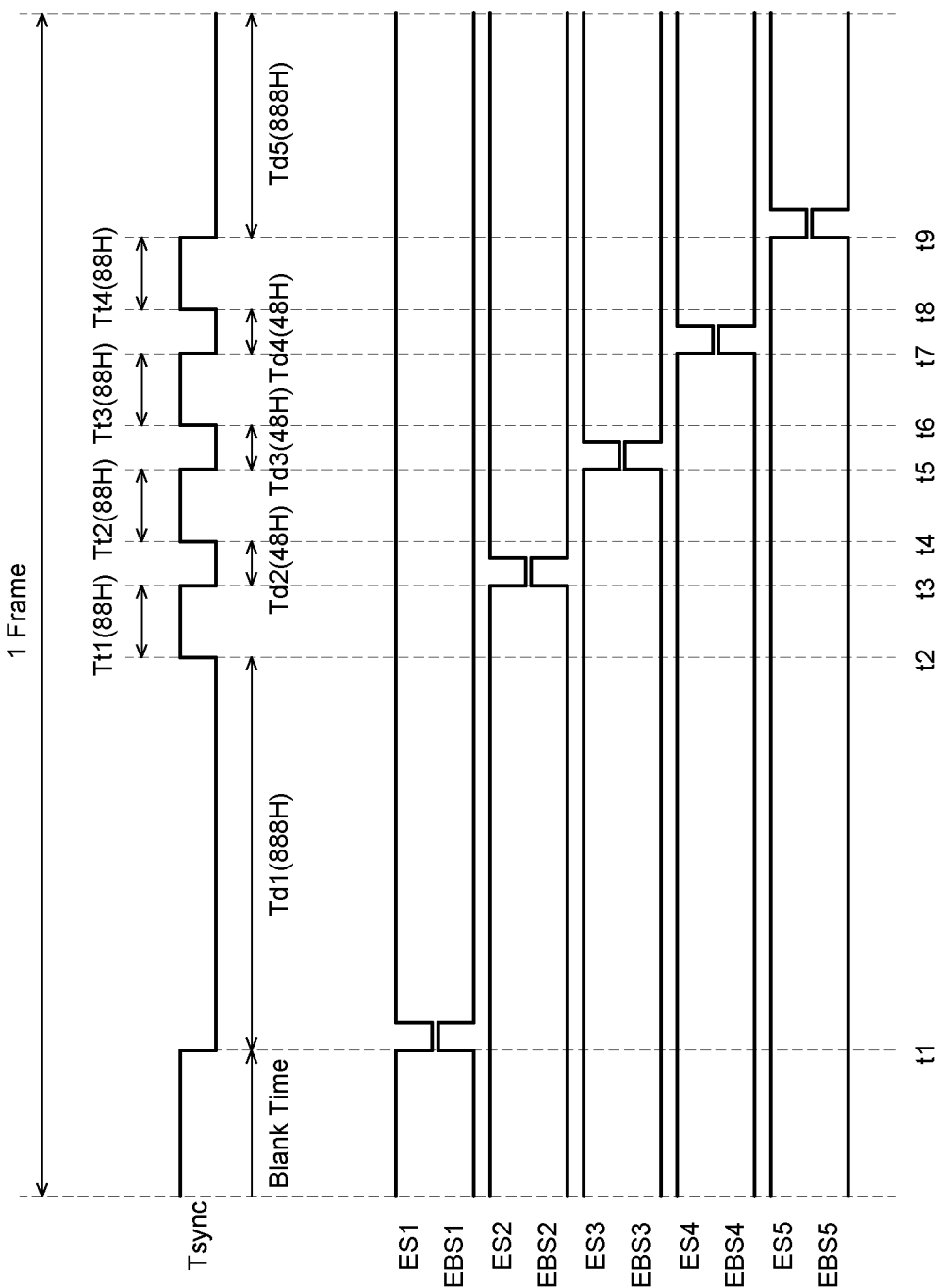
FIG. 7 is a schematic block diagram of the gate driver of the display device according to an exemplary embodiment of the present disclosure.

FIG. 7 is a schematic block diagram of the gate driver of the display device according to an exemplary embodiment of the present disclosure.

Referring to FIGS. 3 and 7, as described above, the display device 100 according to an exemplary embodiment of the present disclosure may time-divide one frame period into the plurality of display periods Td and the plurality of touch sensing periods Tt. The plurality of display periods Td may be started when the plurality of start circuits STC drive the plurality of stage groups STG.

For reference, when a synchronization signal Tsync is at a high level, the display device operates in the display periods Td, and when the synchronization signal Tsync is at a low level, the display device operates in the touch sensing periods Tt.

Specifically, at a first time point t1, the synchronization signal Tsync falls to a low level, the first enable signal ES1 falls to a low level, and the first enable bar signal EBS1 rises to a high level. Accordingly, the first start circuit STC1 applies the first start signal VST1 to the first stage group STG1, and during an 888 horizontal period which is the first display period Td1, the respective stages of the first stage group STG1 sequentially output the scan signals to the first scan line #1 SL to the 888th scan line #888 SL.

Thereafter, at a second time point t2, the synchronization signal Tsync rises to a high level. Accordingly, the touch driver TD drives the touch unit during an 88 horizontal period that is the first touch sensing period Tt1 from the second time point t2.

Thereafter, at a third time point t, the synchronization signal Tsync falls to a low level, the second enable signal ES2 falls to a low level, and the second enable bar signal EBS2 rises to a high level. Accordingly, the second start circuit STG2 applies the second start signal VST2 to the second stage group STG2, and respective stages of the second stage group STG2 sequentially output the scan signals to the 889th scan line #889 SL to the 936th scan line #936 SL.

Thereafter, at a fourth time point t, the synchronization signal Tsync rises to a high level. Accordingly, the touch driver TD drives the touch unit during an 88 horizontal period that is the second touch sensing period Tt2 from the fourth time point t.

Thereafter, at a fifth time point t, the synchronization signal Tsync falls to a low level, the third enable signal ES3 falls to a low level, and the third enable bar signal EBS3 rises to a high level. Accordingly, the third start circuit STC3 applies the third start signal VST3 to the third stage group STG3, and the respective stages of the third stage group STG3 sequentially output the scan signals to the 937th scan line #937 SL to the 984th scan line #984 SL.

Thereafter, at a sixth time point t6, the synchronization signal Tsync rises to a high level. Accordingly, the touch driver TD drives the touch unit during an 88 horizontal period that is the third touch sensing period Tt3 from the sixth time point t6.

Thereafter, at a seventh time point t7, the synchronization signal Tsync falls to a low level, the fourth enable signal ES4 falls to a low level, and the fourth enable bar signal EBS4 rises to a high level. Accordingly, the fourth start circuit STC4 applies the fourth start signal VST4 to the fourth stage group STG4, and the respective stages of the fourth stage group STG4 sequentially output the scan signals to the 985th scan line #985 SL to the 1032nd scan line #1032 SL.

Thereafter, at an eighth time point t8, the synchronization signal Tsync rises to a high level. Accordingly, the touch driver TD drives the touch unit during an 88 horizontal period that is the fourth touch sensing period Tt4 from the eighth time point t8.

Thereafter, at a ninth time point t9, the synchronization signal Tsync falls to a low level, the fifth enable signal ES5 falls to a low level, and the fifth enable bar signal EBS5 rises to a high level. Accordingly, the fifth start circuit STC5 applies the fifth start signal VST5 to the fifth stage group STG5 and the respective stages of the fifth stage group STG5 sequentially output the scan signals to the 1033th scan line #1033 SL to the 1920th scan line #1920 SL during an 888 horizontal period that is the fifth display period Td5.

Figure 8A:
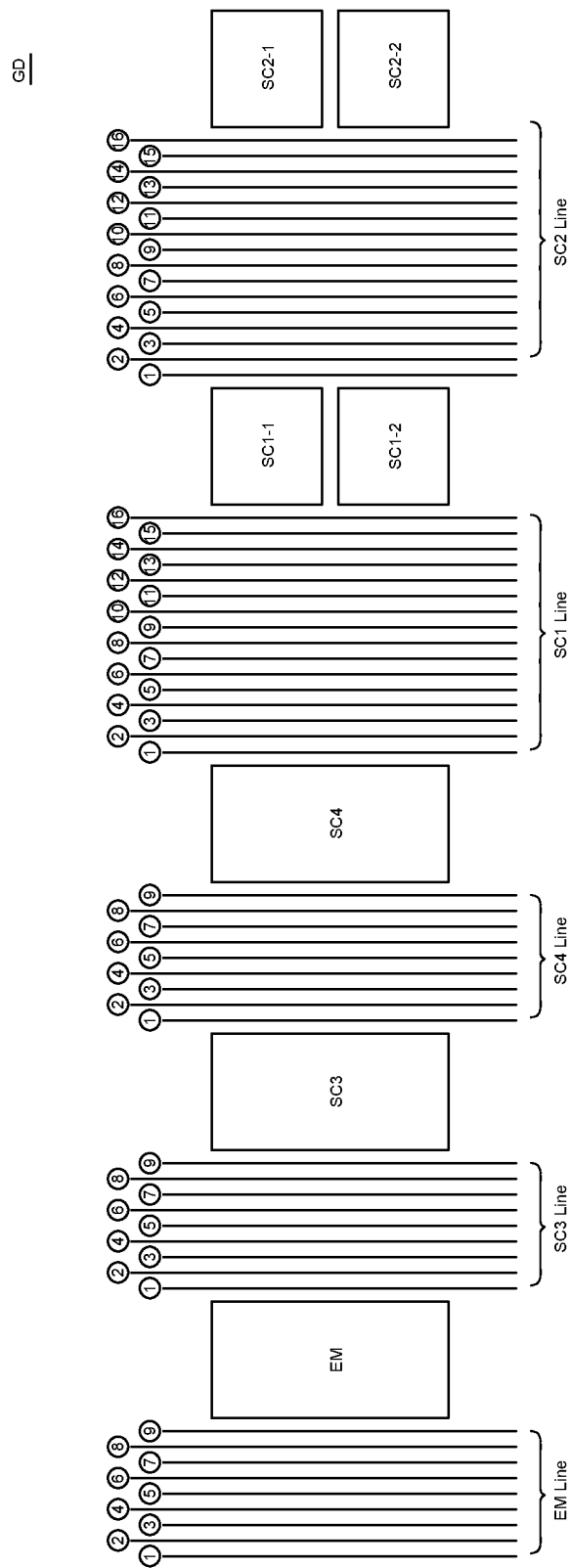
FIG. 8A is a diagram illustrating a plurality of driving lines of a gate driver of a conventional display device.

FIG. 8A is a diagram illustrating a plurality of driving lines of a gate driver of a conventional display device.

Figure 8B:
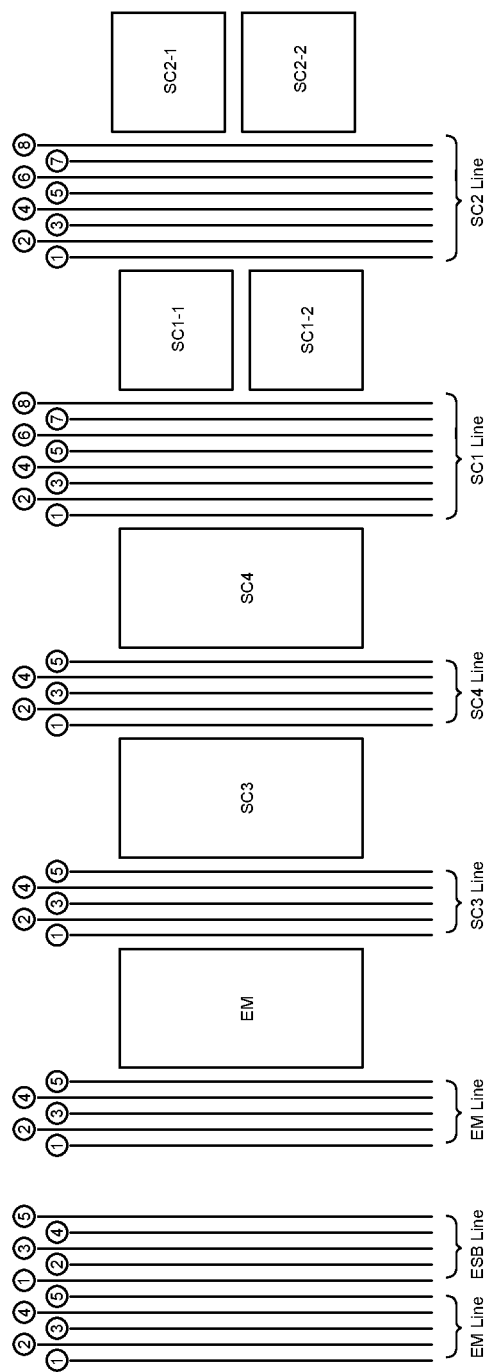
FIG. 8B is a diagram illustrating a plurality of driving lines of a gate driver GD of the display device according to an exemplary embodiment of the present disclosure.

FIG. 8B is a diagram illustrating a plurality of driving lines of the gate driver GD of the display device according to an exemplary embodiment of the present disclosure.

As shown in FIG. 8A, each of the stages disposed in the gate driver GD may include the emission stage EM, the first scan stage SC1, the second scan stage SC2, the third scan stage SC3, and the fourth scan stage SC4.

In order to drive each of the emission stage EM, the third scan stage SC3, and the fourth scan stage SC4, for each of the emission stage EM, the third scan stage SC3, and the fourth scan stage SC4, five start signals VST STG, two clock lines, one gate high voltage Vgh line, and one gate low voltage Vg1 line for driving five stage groups are disposed in the gate driver GD. That is, nine lines EM Line are required to drive the emission stage EM, nine lines SC3 Line are required to drive the third scan stage SC3, and nine lines SC4 Line are required to drive the fourth scan stage SC4.

In addition, five start signal VST lines and two clock lines for driving the odd-numbered first scan stage SC1-1 are disposed in the gate driver GD, five start signal VST lines and two clock lines for driving the even-numbered first scan stage SC1-2 are disposed in the gate driver GD, and one gate high voltage Vgh line and one gate low voltage Vg1 line that are supplied to both the odd-numbered first scan stage SC1-1 and the even-numbered first scan stage SC1-2 are also disposed in the gate driver GD. That is, 16 lines SC1 Line for driving the first scan stages SC1-1 and SC1-2 are required.

In addition, five start signal VST lines and two clock lines for driving the odd-numbered second scan stage SC2-1 are disposed in the gate driver GD, five start signal VST lines and two clock lines for driving the even-numbered second scan stage SC2-2 are disposed in the gate driver GD, and one gate high voltage Vgh line and one gate low voltage Vg1 line that are supplied to both the odd-numbered second scan stage SC2-1 and the even-numbered second scan stage SC2-2 are also disposed in the gate driver GD. That is, 16 lines SC2 Line for driving the second scan stages SC2-1 and SC2-2 are required.

Accordingly, the number of lines required for the gate driver GD of the conventional display device is 59.

On the other hand, since the gate driver GD of the display device according to an exemplary embodiment of the present disclosure includes the plurality of start circuits STC, only one start signal VST line is required for each of the emission stage EM, the first scan stage SC1, the second scan stage SC2, the third scan stage SC3, and the fourth scan stage SC4.

Specifically, in order to drive each of the emission stage EM, the third scan stage SC3, and the fourth scan stage SC4, for each of the emission stage EM, the third scan stage SC3, and the fourth scan stage SC4, one start signal VST line, two clock lines, one gate high voltage Vgh line, and one gate low voltage Vg1 line for driving five stage groups STG are disposed in the gate driver GD. That is, five lines EM Line are required to drive the emission stage EM, five lines SC3 Line are required to drive the third scan stage SC3, and five lines SC4 Line are required to drive the fourth scan stage SC4.

In addition, one start signal VST line and two clock lines for driving the odd-numbered first scan stage SC1-1 are disposed in the gate driver GD, one start signal VST line and two clock lines for driving the even-numbered first scan stage SC1-2 are disposed in the gate driver GD, and one gate high voltage Vgh line and one gate low voltage Vg1 line that are supplied to both the odd-numbered first scan stage SC1-1 and the even-numbered first scan stage SC1-2 are also disposed in the gate driver GD. That is, eight lines SC1 Line for driving the first scan stages SC1-1 and SC1-2 are required.

In addition, one start signal VST line and two clock lines for driving the odd-numbered second scan stage SC2-1 are disposed in the gate driver GD, one start signal VST line and two clock lines for driving the even-numbered second scan stage SC2-2 are disposed in the gate driver GD, and one gate high voltage Vgh line and one gate low voltage Vg1 line that are supplied to both the odd-numbered second scan stage SC2-1 and the even-numbered second scan stage SC2-2 are also disposed in the gate driver GD. That is, eight lines SC2 Line for driving the second scan stages SC2-1 and SC2-2 are required.

In addition, five enable signal lines ES Line and five enable bar signal lines EBS for driving five start circuits STC that apply the start signals VST to five stage groups STG are disposed in the gate driver GD.

Accordingly, the number of lines required for the gate driver GD of the display device according to an exemplary embodiment is 41.

That is, the number of lines disposed in the gate driver of the display device according to an exemplary embodiment of the present disclosure may be reduced by about 14, compared to the number of lines disposed in the gate driver of the conventional display device.

In other words, the gate driver of the display device according to an exemplary embodiment of the present disclosure can allow for a dramatic reduction in the number of lines of the start signals for IFP driving.

Accordingly, an area of the gate driver of the display device according to an exemplary embodiment of the present disclosure is reduced, so that a size of a bezel can be reduced. In addition, since the number of lines in the gate driver of the display device according to an exemplary embodiment is reduced, there is an advantage that manufacturing costs can also be reduced.

Hereinafter, a gate driver and a display device including the gate driver according to another exemplary embodiment of the present disclosure will be described. Another exemplary embodiment of the present disclosure further includes bootstrapping capacitors and an enable transistor, compared to an exemplary embodiment of the present disclosure.

Figure 9:
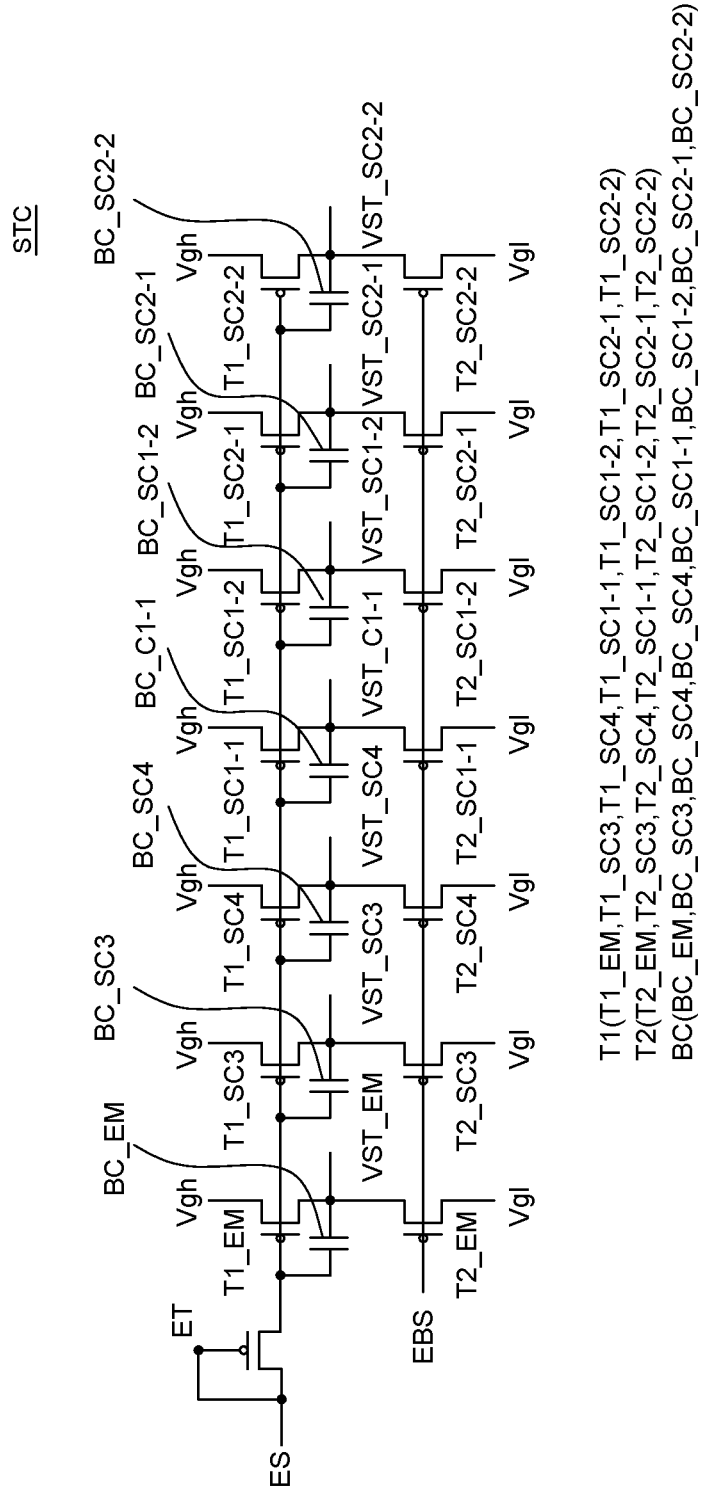
FIG. 9 is a circuit diagram illustrating a start circuit of a gate driver of a display device according to another exemplary embodiment of the present disclosure.

FIG. 9 is a circuit diagram illustrating a start circuit of a gate driver of a display device according to another exemplary embodiment of the present disclosure.

As shown in FIG. 9, each of a plurality of start circuits STC includes an enable transistor ET that determines a charging timing of an enable signal ES, a plurality of pull-up transistors T1 to which the enable signal ES is applied, a plurality of pull-down transistors T2 to which an enable bar signal EBS is applied, and bootstrapping capacitors BC that bootstrap the plurality of start signals VST.

Each of the enable transistor ET, the pull-up transistors T1, and the pull-down transistors T2 described above may be a low-temperature polycrystalline silicon (LTPS) thin film transistor that is a p-type MOSFET (PMOS).

The plurality of pull-up transistors T1 output gate high voltages Vgh as a plurality of start signals VST according to the enable signal ES.

Specifically, the enable transistor ET is a signal that determines the charging timing of the enable signal ES applied to each of the plurality of pull-up transistors T1.

The enable signal ES is applied to a gate electrode and a source electrode of the enable transistor ET, and the enable transistor ET is connected to gate electrodes of the plurality of pull-up transistors T1. That is, the enable transistor ET functions as a buffer to apply the enable signal ES to each of the plurality of pull-up transistors T1.

In addition, each of the plurality of pull-up transistors T1 includes a gate electrode to which the enable signal ES is applied, a source electrode to which the gate high voltage Vgh is applied, and a drain electrode configured to output the start signal VST to each stage. Accordingly, each of the plurality of pull-up transistors T1 outputs the gate high voltage Vgh as the start signal VST to each stage ST when the enable signal ES of a low level, which is a turn-on level, is applied.

For example, the plurality of pull-up transistors T1 may include an emission pull-up transistor T1_EM, an odd-numbered first scan pull-up transistor T1_SC1-1, an even-numbered first scan pull-up transistor T1_SC1-2, an odd-numbered second scan pull-up transistor T1_SC2-1, an even-numbered second scan pull-up transistor T1_SC2-2, a third scan pull-up transistor T1_SC3, and a fourth scan pull-up transistor T1_SC4.

In addition, the emission pull-up transistor T1_EM outputs the gate high voltage Vgh as an emission start signal VST_EM while the enable signal ES is at a low level. In addition, the odd-numbered first scan pull-up transistor T1_SC1-1 outputs the gate-high voltage Vgh as an odd-numbered first scan start signal VST_SC1-1 while the enable signal ES is at a low level. In addition, the even-numbered first scan pull-up transistor T1_SC1-2 outputs the gate high voltage Vgh as an odd-numbered first scan start signal VST_SC1-2 while the enable signal ES is at a low level. In addition, the odd-numbered second scan pull-up transistor T1_SC2-1 outputs the gate high voltage Vgh as an odd-numbered second scan start signal VST_SC2-1 while the enable signal ES is at a low level. In addition, the even-numbered second scan pull-up transistor T1_SC2-2 outputs the gate high voltage Vgh as an odd-numbered second scan start signal VST_SC2-2 while the enable signal ES is at a low level. In addition, the third scan pull-up transistor T1_SC3 outputs the gate high voltage Vgh as a third scan start signal VST_SC3 while the enable signal ES is at a low level, and the fourth scan pull-up transistor T1_SC4 outputs the gate high voltage Vgh as a fourth scan start signal VST_SC4 while the enable signal ES is at a low level.

The plurality of bootstrapping capacitors BC may bootstrap gate nodes of the plurality of pull-up transistors T1 to thereby improve output characteristics of the plurality of start signals VST.

Specifically, one electrode of each of the plurality of bootstrapping capacitors BC is connected to the gate electrode of each of the plurality of pull-up transistors T1, and the other electrode of each of the plurality of bootstrapping capacitors BC is connected to the drain electrode of each of the plurality of pull-up transistors T1. Accordingly, the gate nodes of the plurality of pull-up transistors T1 may be bootstrapped by the plurality of start signals VST that are the gate high voltages Vgh output to the drain electrodes of the plurality of respective pull-up transistors T1. Accordingly, output characteristics of the plurality of start signals VST may be improved.

For example, the plurality of bootstrapping capacitors BC may include an emission bootstrapping capacitor BC_EM, an odd-numbered first scan bootstrapping capacitor BC_SC1-1, an even-numbered first scan bootstrapping capacitor BC_SC1-2, an odd-numbered second scan bootstrapping capacitor BC_SC2-1, an even-numbered second scan bootstrapping capacitor BC_SC2-2, a third scan bootstrapping capacitor BC_SC3, and a fourth scan bootstrapping capacitor BC_SC4.

The emission bootstrapping capacitor BC_EM is connected to a gate electrode and a drain electrode of the emission pull-up transistor T1_EM and bootstraps the gate electrode of the emission pull-up transistor T1_EM, so that output characteristics of the emission start signal VST_EM may be improved.

The odd-numbered first bootstrapping capacitor BC_SC1-1 is connected to a gate electrode and a drain electrode of the odd-numbered first pull-up transistor T1_SC1-1 and bootstraps the gate electrode of the odd-numbered first pull-up transistor T1_SC1-1, so that output characteristics of the odd-numbered first start signal VST_SC1-1 may be improved.

The even-numbered first bootstrapping capacitor BC_SC1-2 is connected to a gate electrode and a drain electrode of the even-numbered first pull-up transistor T1_SC1-2 and bootstraps the gate electrode of the even-numbered first pull-up transistor T1_SC1-2, so that output characteristics of the even-numbered first start signal VST_SC1-2 may be improved.

The odd-numbered second bootstrapping capacitor BC_SC2-1 is connected to a gate electrode and a drain electrode of the odd-numbered second pull-up transistor T1_SC2-1 and bootstraps the gate electrode of the odd-numbered second pull-up transistor T1_SC2-1, so that output characteristics of the odd-numbered second start signal VST_SC2-1 may be improved.

The even-numbered second bootstrapping capacitor BC_SC2-2 is connected to a gate electrode and a drain electrode of the second even-numbered pull-up transistor T1_SC2-2 and bootstraps the gate electrode of the second even-numbered pull-up transistor T1_SC2-2, so that output characteristics of the even-numbered second start signal VST_SC2-2 may be improved.

The third bootstrapping capacitor BC_SC3 is connected to a gate electrode and a drain electrode of the third pull-up transistor T1_SC3 and bootstraps the gate electrode of the third pull-up transistor T1_SC3, so that output characteristics of the third start signal VST_SC3 may be improved.

The fourth bootstrapping capacitor BC_SC4 is connected to a gate electrode and a drain electrode of the fourth pull-up transistor T1_SC4 and bootstraps the gate electrode of the fourth pull-up transistor T1_SC4, so that output characteristics of the fourth start signal VST_SC4 may be improved.

The plurality of pull-down transistors T2 output the gate low voltages Vg1 as the plurality of start signals VST according to the enable bar signal EBS.

Specifically, each of the plurality of pull-down transistors T2 includes a gate electrode to which the enable bar signal EBS is applied, a source electrode to which the gate low voltage Vg1 is applied, and a drain electrode configured to output the start signal VST to each stage. Accordingly, each of the plurality of pull-down transistors T2 outputs the gate low voltage Vg1 as the start signal VST to each stage ST when the enable bar signal EBS of a low level, which is a turn-on level, is applied.

For example, the plurality of pull-down transistors T2 may include an emission pull-down transistor T2_EM, an odd-numbered first scan pull-down transistor T2_SC1-1, an even-numbered first scan pull-down transistor T2_SC1-2, an odd-numbered second scan pull-down transistor T2_SC2-1, an even-numbered second scan pull-down transistor T2_SC2-2, a third scan pull-down transistor T2_SC3, and a fourth scan pull-down transistor T2_SC4.

In addition, the emission pull-down transistor T2_EM outputs the gate low voltage Vg1 as the emission start signal VST_EM while the enable bar signal EBS is at a low level. In addition, the odd-numbered first scan pull-down transistor T2_SC1-1 outputs the gate low voltage Vg1 as the odd-numbered first scan start signal VST_SC1-1 while the enable bar signal EBS is at a low level. In addition, the even-numbered first scan pull-down transistor T2_SC1-2 outputs the gate low voltage Vg1 as the odd-numbered first scan start signal VST_SC1-2 while the enable bar signal EBS is at a low level. In addition, the odd-numbered second scan pull-down transistor T2_SC2-1 outputs the gate low voltage Vg1 as the odd-numbered second scan start signal VST_SC2-1 while the enable bar signal EBS is at a low level. In addition, the even-numbered second scan pull-down transistor T2_SC2-2 outputs the gate low voltage Vg1 as the odd-numbered second scan start signal VST_SC2-2 while the enable bar signal EBS is at a low level. In addition, the third scan pull-down transistor T2_SC3 outputs the gate low voltage Vg1 as the third scan start signal VST_SC3 while the enable bar signal EBS is at a low level. In addition, the fourth scan pull-down transistor T2_SC4 outputs the gate low voltage Vg1 as the fourth scan start signal VST_SC4 while the enable bar signal EBS is at a low level.

Another exemplary embodiment of the present disclosure further includes the bootstrapping capacitors and the enable transistor, as compared to an exemplary embodiment of the present disclosure, so that output characteristics of the plurality of start signals VST may be improved by bootstrapping the gate nodes of the plurality of pull-up transistors T1.

The exemplary embodiments of the present disclosure can also be described as follows:

A gate driver according to an exemplary embodiment of the present disclosure includes a plurality of stage groups each including a plurality of stages; and a plurality of start circuits each configured to output a start signal to each of the plurality of stage groups, wherein each of the plurality of start circuits outputs the start signal to an uppermost stage among the plurality of stages of each of the plurality of stage groups, so that an area of the gate driver can be reduced.

Each of the plurality of start circuits may be synchronized with an enable signal that is sequentially output and an enable bar signal that is sequentially output, and sequentially outputs the start signal.

Each of the plurality of start circuits may include at least one pull-up transistor configured to output a gate high voltage as the start signal according to the enable signal; and at least one pull-down transistor configured to output a gate low voltage as the start signal according to the enable bar signal.

Each of the at least one pull-up transistor and the at least one pull-down transistor may be a low-temperature polycrystalline silicon (LTPS) thin film transistor that is a p-type MOSFET (PMOS).

Each of the at least one pull-up transistor may include a gate electrode to which the enable signal is applied, a source electrode to which the gate high voltage is applied, and a drain electrode configured to output the start signal to each stage.

Each of the plurality of pull-down transistors may include a gate electrode to which the enable bar signal is applied, a source electrode to which the gate low voltage is applied, and a drain electrode configured to output the start signal to each stage.

The at least one pull-up transistor may include an emission pull-up transistor, an odd-numbered first scan pull-up transistor, an even-numbered first scan pull-up transistor, an odd-numbered second scan pull-up transistor, an even-numbered second scan pull-up transistor, a third scan pull-up transistor, and a fourth scan pull-up transistor.

The at least one pull-down transistor may include an emission pull-down transistor, an odd-numbered first scan pull-down transistor, an even-numbered first scan pull-down transistor, an odd-numbered second scan pull-down transistor, an even-numbered second scan pull-down transistor, a third scan pull-down transistor, and a fourth scan pull-down transistor.

The gate driver may further comprise an inverter configured to receive the enable signal to thereby generate the enable bar signal, and outputs the enable bar signal to each of the plurality of start circuits.

The inverter may be configured as a complementary-MOS (CMOS) circuit.

Each of the plurality of start circuits may further include at least one bootstrapping capacitor that may be connected to a gate electrode and a drain electrode of the at least one pull-up transistor.

Each of the plurality of start circuits may further include an enable transistor having a gate electrode and a source electrode to which the enable signal may be applied and a drain electrode which may be connected to a gate electrode of the at least one pull-up transistor.

Each of the enable transistor, the at least one pull-up transistor and the at least one pull-down transistor may be a low-temperature polycrystalline silicon (LTPS) thin film transistor that is a p-type MOSFET (PMOS).

A lowest stage of each of the plurality of stage groups separates from an uppermost stage of a next stage group.

Each of the plurality of stages may include an emission stage, a first scan stage, a second scan stage, a third scan stage, and a fourth scan stage.

A display device according to another exemplary embodiment of the present disclosure includes a display panel including a display area in which a plurality of sub-pixels are disposed and a non-display area outside the display area; a gate driver disposed in the non-display area; and a touch driver configured to detect a touch input on the display panel, wherein the gate driver includes a plurality of stage groups each including a plurality of stages and a plurality of start circuits each configured to output a start signal to each of the plurality of stage groups, wherein each of the plurality of start circuits outputs the start signal to an uppermost stage among the plurality of stages of each of the plurality of stage groups, so that a size of a bezel area of the display panel can be minimized.

One frame period may be divided into a plurality of display periods and a plurality of touch sensing periods that are alternately repeated.

Each of the plurality of stage groups may output a scan signal in each of the plurality of display periods.

The touch driver may detect a touch input in each of the plurality of touch sensing periods.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A gate driver, comprising:
a plurality of stage groups each including a plurality of stages; and
a plurality of start circuits, each of the plurality of start circuits being configured to output a start signal to a corresponding one of the plurality of stage groups,
wherein each of the plurality of start circuits outputs the start signal to an uppermost stage among the plurality of stages of the corresponding one of the plurality of stage groups without each of the plurality of the starts circuits outputting the start signal to remaining stages among the plurality of stages of the corresponding one of the plurality of stage groups, and
wherein each of the plurality of start circuits includes:
at least one pull-up transistor including a gate electrode to which an enable signal is applied, a source electrode to which a gate high voltage is applied, and a drain electrode configured to output the start signal to the corresponding one of the plurality of stage groups and configured to output the gate high voltage as the start signal according to the enable signal; and
at least one pull-down transistor including a gate electrode to which an enable bar signal is applied and the at least one pull-down transistor configured to output a gate low voltage as the start signal according to the enable bar signal, the enable bar signal having a level that is opposite of a level of the enable signal during an entire duration of a frame period.

2. The gate driver of claim 1,
wherein each of the plurality of start circuits is synchronized with the enable signal that is sequentially output and the enable bar signal that is sequentially output, and sequentially outputs the start signal.

3. The gate driver of claim 2,
wherein each of the at least one pull-up transistor and the at least one pull-down transistor is a low-temperature polycrystalline silicon (LTPS) thin film transistor that is a p-type MOSFET (PMOS).

4. The gate driver of claim 2,
wherein each of the plurality of pull-down transistors further includes a source electrode to which the gate low voltage is applied, and a drain electrode configured to output the start signal to each of the stages.

5. The gate driver of claim 2,
wherein the at least one pull-up transistor includes an emission pull-up transistor, an odd-numbered first scan pull-up transistor, an even-numbered first scan pull-up transistor, an odd-numbered second scan pull-up transistor, an even-numbered second scan pull-up transistor, a third scan pull-up transistor, and a fourth scan pull-up transistor.

6. The gate driver of claim 5,
wherein the at least one pull-down transistor includes an emission pull-down transistor, an odd-numbered first scan pull-down transistor, an even-numbered first scan pull-down transistor, an odd-numbered second scan pull-down transistor, an even-numbered second scan pull-down transistor, a third scan pull-down transistor, and a fourth scan pull-down transistor.

7. The gate driver of claim 2, further comprising:
an inverter configured to receive the enable signal to generate the enable bar signal and output the enable bar signal to each of the plurality of start circuits.

8. The gate driver of claim 7,
wherein the inverter is configured as a complementary-MOS (CMOS) circuit.

9. The gate driver of claim 2,
wherein each of the plurality of start circuits further includes at least one bootstrapping capacitor that is connected to a gate electrode and a drain electrode of the at least one pull-up transistor.

10. The gate driver of claim 2,
wherein each of the plurality of start circuits further includes an enable transistor having a gate electrode and a source electrode to which the enable signal is applied and a drain electrode which is connected to a gate electrode of the at least one pull-up transistor.

11. The gate driver of claim 10,
wherein each of the enable transistor, the at least one pull-up transistor and the at least one pull-down transistor is a low-temperature polycrystalline silicon (LTPS) thin film transistor that is a p-type MOSFET (PMOS).

12. The gate driver of claim 1,
wherein a lowest stage of each of the plurality of stage groups separates from an uppermost stage of a next stage group.

13. The gate driver of claim 1,
wherein each of the plurality of stages includes an emission stage, a first scan stage, a second scan stage, a third scan stage, and a fourth scan stage.

14. A display device, comprising:
a display panel including a display area in which a plurality of sub-pixels are disposed and a non-display area outside the display area;
the gate driver according to claim 1, the gate driver being disposed in the non-display area; and a touch driver configured to detect a touch input on the display panel.

15. The display device of claim 14,
wherein one frame period is divided into a plurality of display periods and a plurality of touch sensing periods that are alternately repeated,
wherein each of the plurality of stage groups outputs a scan signal in each of the plurality of display periods,
wherein the touch driver detects a touch input in each of the plurality of touch sensing periods.

16. A gate driver, comprising:
a plurality of stage groups each including a plurality of stages; and
a plurality of start circuits, each of the plurality of start circuits being configured to output a start signal to a corresponding one of the plurality of stage groups,
wherein each of the plurality of start circuits outputs the start signal to an uppermost stage among the plurality of stages of the corresponding one of the plurality of stage groups,
wherein each of the plurality of start circuits includes:
at least one pull-up transistor configured to output a gate high voltage as the start signal according to an enable signal supplied by a respective first signal line; and
at least one pull-down transistor configured to output a gate low voltage as the start signal according to an enable bar signal supplied by a respective second signal line, and
wherein the at least one pull-up transistor includes an emission pull-up transistor having a gate electrode that receives the enable signal from the respective first signal line, an odd-numbered first scan pull-up transistor having a gate electrode that receives the enable signal from the respective first signal line, an even-numbered first scan pull-up transistor having a gate electrode that receives the enable signal from the respective first signal line, an odd-numbered second scan pull-up transistor having a gate electrode that receives the enable signal from the respective first signal line, an even-numbered second scan pull-up transistor having a gate electrode that receives the enable signal from the respective first signal line, a third scan pull-up transistor having a gate electrode that receives the enable signal from the respective first signal line, and a fourth scan pull-up transistor having a gate electrode that receives the enable signal from the respective first signal line.

17. A gate driver, comprising:
a plurality of stage groups each including a plurality of stages; and
a plurality of start circuits, each of the plurality of start circuits configured to output a start signal to a corresponding one of the plurality of stage groups without each of the plurality of starts circuits outputting the start signal to remaining stages among the plurality of stages of each of the plurality of stage groups,
wherein each of the plurality of start circuits outputs the start signal to an uppermost stage among the plurality of stages of the corresponding one of the plurality of stage groups, and
wherein each stage of the plurality of stages in a stage group from the plurality of stage groups includes a respective emission stage that is configured to output an emission signal, a respective first scan stage that is configured to output a first scan signal, a respective second scan stage that is configured to output a second scan signal, a respective third scan stage that is configured to output a third scan signal, and a respective fourth scan stage that is configured to output a fourth scan signal,
wherein the respective emission signal output by the respective emission stage of the stage, the respective first scan signal output by the respective first scan stage of the stage, the respective second scan signal output by the respective second scan stage of the stage, the respective third scan signal output by the respective third scan stage of the stage, and the respective fourth scan signal output by the respective fourth scan stage of the stage are input to a subsequent stage from the plurality of stages that is arranged after the stage in the stage group,
wherein each of the plurality of start circuits includes:
at least one pull-up transistor including a gate electrode to which an enable signal is applied, a source electrode to which a gate high voltage is applied, and a drain electrode configured to output the start signal to the corresponding one of the plurality of stage groups and configured to output the gate high voltage as the start signal according to the enable signal; and
at least one pull-down transistor including a gate electrode to which an enable bar signal is applied and the at least one pull-down transistor configured to output a gate low voltage as the start signal according to the enable bar signal, the enable bar signal having a level that is opposite of a level of the enable signal during an entire duration of a frame period.

18. The gate driver of claim 17, wherein the respective emission stage outputs the respective emission signal to a pixel,
wherein the respective first scan stage to the respective fourth scan stage output first scan signals to fourth scan signals to pixels, respectively.

19. The gate driver of claim 18, wherein the respective first scan stage includes an even-numbered first scan stage configured to output an even-numbered first scan signal and an odd-numbered first scan stage configured to output an odd-numbered first scan signal, and
wherein the respective second scan stage includes an even-numbered second scan stage configured to output an even-numbered second scan signal and an odd-numbered second scan stage configured to output an odd-numbered second scan signal.

20. The gate driver of claim 19, wherein the even-numbered first scan signal is applied to an even-numbered scan line and the odd-numbered first scan signal is applied to an odd-numbered scan line, and
wherein the even-numbered second scan signal is applied to the even-numbered scan line and the odd-numbered second scan signal is applied to the odd-numbered scan line.

* * * * *